United States Patent [19]

Wallace

[11] Patent Number: 4,951,393

[45] Date of Patent: Aug. 28, 1990

[54] WIRE STRIPPER

[76] Inventor: Archie C. Wallace, 718 Elmer Rd., Elmer, La. 71424

[21] Appl. No.: 381,256

[22] Filed: Jul. 18, 1989

[51] Int. Cl.$^5$ .............................................. B21F 13/00
[52] U.S. Cl. ........................................ 30/90.4; 81/9.4
[58] Field of Search .................... 30/90.1, 90.2, 90.3, 30/90.4; 81/9.4; 7/107

[56] References Cited

U.S. PATENT DOCUMENTS

| | | | |
|---|---|---|---|
| 3,447,172 | 6/1969 | Clark | 30/90.4 |
| 3,710,443 | 1/1973 | Stahel | 30/90.1 |
| 4,094,213 | 6/1978 | Bradley | 30/90.1 |

Primary Examiner—Frank T. Yost
Assistant Examiner—Willmon Fridie, Jr.
Attorney, Agent, or Firm—Fleit, Jacobson, Cohn, Price, Holman & Stern

[57] ABSTRACT

A wire stripper of simple, rugged and dependable construction for efficiently stripping insulation from conductive wires. The wire stripper includes pivotally related components gripped in one hand of a person using the device with one of the components including a blade and the other component being movable toward the blade for engagement with an insulated wire positioned between the blade and the component movable toward and away from the blade. The interconnection between the components includes a hinge structure to space the components from each other to receive an insulated conductive wire or wires therebetween and including a transverse pivot axis formed by a yoke structure which spaces the two components from each other and enables the components to rock or pivot in relation to each other. In one embodiment of the invention, a depth control assembly is provided for the insulation slitting blade. Also, an adapter is provided to peripherally cut the insulation to facilitate removal thereof and an adapter is provided to closely engage single insulated wires.

10 Claims, 2 Drawing Sheets

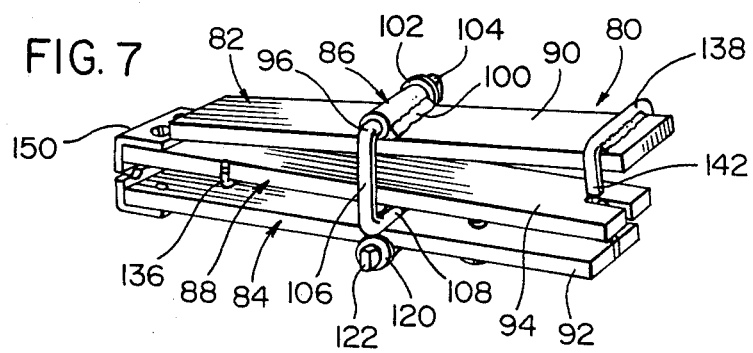
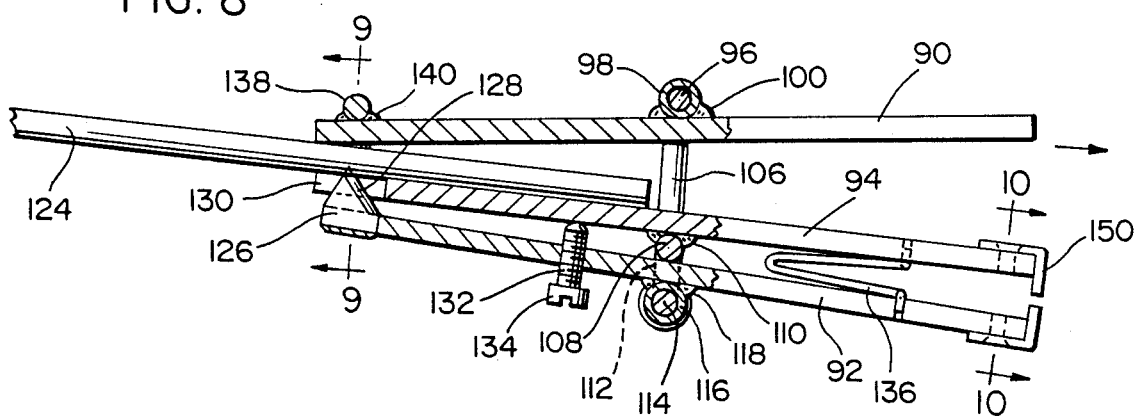
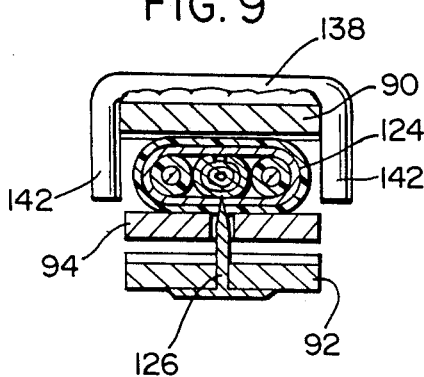
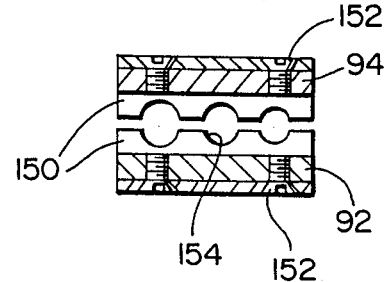
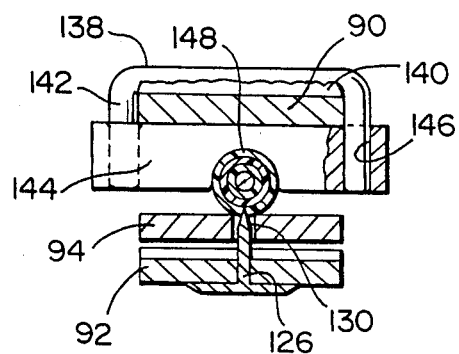

WIRE STRIPPER

BACKGROUND OF THE INVENTION

1. FIELD OF THE INVENTION

The present invention generally relates to a hand tool for use by electricians and others working with insulated wires and more specifically to a wire stripper of simple, rugged and dependable construction for efficiently stripping insulation from conductive wires. The wire stripper includes pivotally related components gripped in one hand of a person using the device with one of the components including a blade and the other component being movable toward the blade for engagement with an insulated wire positioned between the blade and the component movable toward and away from the blade. The interconnection between the components includes a hinge structure to space the components from each other to receive an insulated conductive wire or wires therebetween and including a transverse pivot axis formed by a yoke structure which spaces the two components from each other and enables the components to rock or pivot in relation to each other. In one embodiment of the invention, a depth control assembly is provided for the insulation slitting blade. Also, an adapter is provided to peripherally cut the insulation to facilitate removal thereof and an adapter is provided to closely engage single insulated wires.

2. INFORMATION DISCLOSURE STATEMENT

Removing insulation from electrically conductive wires requires considerable expenditure of time and manual dexterity by the person engaged in this activity. Various special tools have been developed to facilitate removal of insulating material from various types of wires. The following U.S. patents disclose tools of this type:

1,157,214
2,468,407
2,643,561
4,536,957
4,674,183
4,785,535

The above listed patents do not disclose the specific offset arrangement of the hinge connection, the depth adjustment, the specific construction of the blade, guide flanges and wire structure of one component of the present invention.

SUMMARY OF THE INVENTION

An object of the present invention is to provide a wire stripper for removing insulation of various types from various types of electrically conductive wires in a simple, efficient and dependable manner with the wire stripper including a pair of generally elongated components with one of the components having a centrally disposed blade at one end thereof projecting toward the other component with the components being connected together at the central area thereof for rocking movement about a hinge axis. The structure which interconnects the components maintain the components in spaced relation to receive an insulated wire or wires to be stripped therebetween to that manual pressure exerted against outer surfaces of the components at the blade end thereof will effectively slit insulating material on a wire when the wire stripper is moved longitudinally in relation to the insulated wire received between the blade end of the components.

Another object of the invention is to provide a wire stripper in accordance with the preceding object in which the component having the blade thereon includes a depth control component that can be manually adjusted for varying the depth of penetration of the blade in the insulation material covering the conductive wire.

A further object of the invention is to provide a wire stripper in accordance with the preceding objects in which the blade receiving component is constructed of a generally U-shaped wire member having loops formed centrally therein for receiving one end of a generally U-shaped yoke for pivotally connecting the components.

Still another object of the invention is to provide a wire stripper in accordance with the preceding objects with guide flanges being provided on at least one of the components for maintaining the insulated wire in registry with the blade during relative longitudinal movement between the wire and wire stripper.

A still further object of the invention is to provide a wire stripper in accordance with the preceding objects in which the wire stripper includes adapters to peripherally cut insulation to facilitate stripping from the wire and to closely receive a portion of the periphery of a single insulated wire to more accurately relate it to the blade during relative longitudinal movement.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 6 is a perspective view of a multiple wire cable illustrating the slit formed therein.

FIG. 7 is a perspective view of another form of the wire stripper.

FIG. 8 is a longitudinal, sectional view, on an enlarged scale, of the wire stripper illustrated in FIG. 7.

FIG. 9 is a transverse, sectional view taken substantially upon a plane passing along section line 9—9 on FIG. 8 illustrating specific structural details of this embodiment of the wire stripper.

FIG. 10 is a transverse, sectional view taken substantially upon a plane passing along section line 10—10 on FIG. 8 illustrating structural details of the peripheral cutter for insulating material.

FIG. 11 is a sectional view similar to FIG. 9 but illustrating an adapter attached to the guide members for closely receiving and guiding a single insulated wire.

DESCRIPTION OF THE PREFERRED EMBODIMENTS

Figure 1:
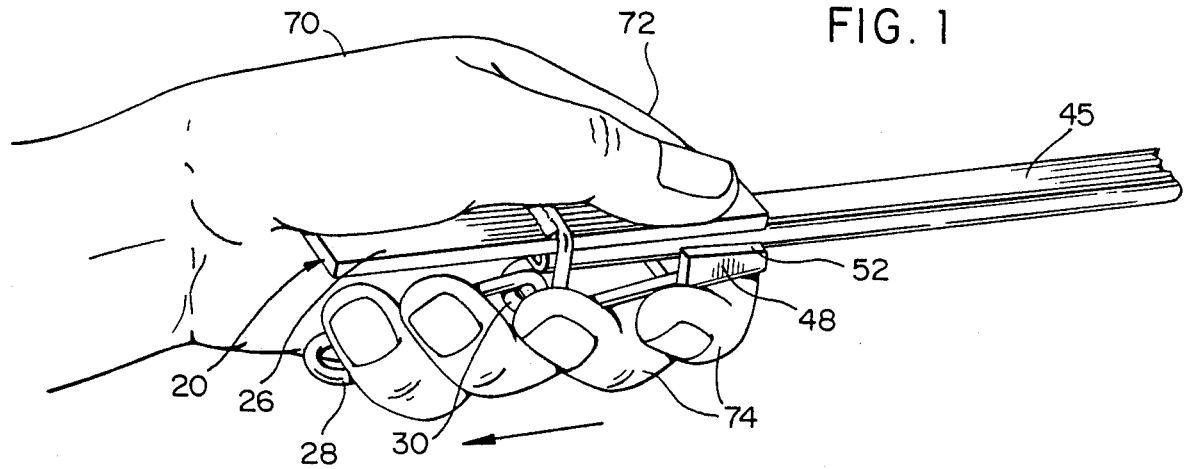
FIG. 1 is a perspective view of the wire stripper of the present invention illustrating the manner in which it is used.
Figure 2:
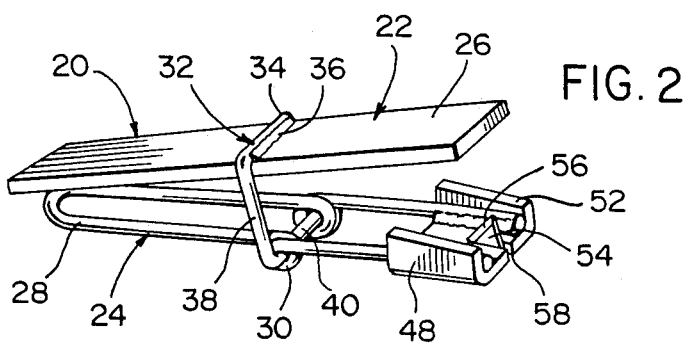
FIG. 2 is a perspective view of the wire stripper.

Referring now specifically to FIGS. 1-6, the embodiment of the wire stripper illustrated therein is generally designated by the reference numeral 20 and includes a pair of generally elongated components 22 and 24 with the component 22 being generally in the form of a substantially rigid, flat, elongated rectangular plate 26 which, when used, is oriented in an upper position for use in a manner described hereinafter.

Figure 3:
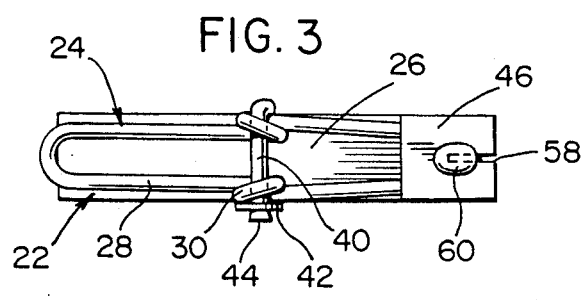
FIG. 3 is a bottom plan view of the wire stripper.

The lower component 24 is in the form of an elongated, U-shaped wire member 28 having generally the same dimensional characteristics and peripheral dimensions as the plate 26 as illustrated in the bottom plan view of FIG. 3. Centrally of the wire member 28, each of the legs 29 thereof is provided with a loop 30 formed therein with the loops 30 being transversely aligned with each other to receive a portion of a hinge member generally designated by the numeral 32 and which is n the form of a laterally opening U-shaped yoke of wire rod construction with the hinge member 32 including an upper horizontal leg 34 welded to the outer surface of the central portion of the plate 26 as at 36. The bight portion of the laterally opening U-shaped hinge member 32 is designated by the numeral 38 and is perpendicular with respect to the leg 34 and also perpendicular with respect to the lower leg 40 of the hinge member 32. The lower leg 40 of the hinge member 32 extends through the loops 30 and the free end thereof is provided with a washer 42 and includes an enlarged or peaned end 44 to retain the washer in place. The washer 42 and the length of the leg 40 is such that the loops 30 will not move longitudinally on the leg 40 but will pivot about an axis defined by the leg 40. Thus, the upper component 22 and the lower component 24 are pivotally interconnected but are spaced apart in a manner that an electrical conductor or cable 45 can be laterally received therebetween.

Figure 5:
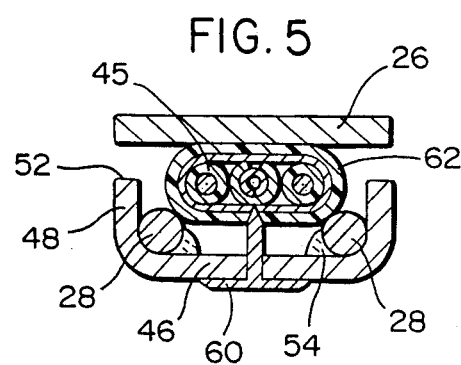
FIG. 5 is a transverse, sectional view, on an enlarged scale, taken along section line 5—5 on FIG. 4.
Figure 4:
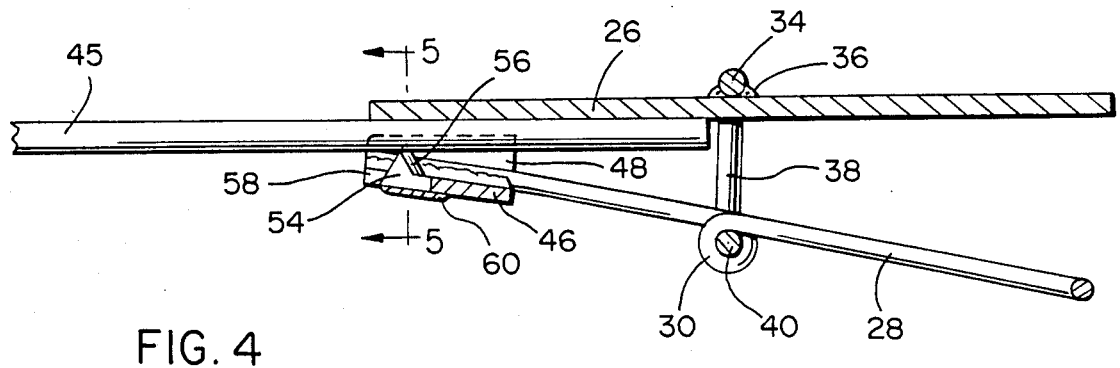
FIG. 4 is a longitudinal, sectional view of the wire stripper on an enlarged scale.

The free ends of the legs 29 of the lower component 24 are interconnected by a relatively short plate 46 which includes upturned side edges or flanges 48 which extend upwardly above the upper surface of the legs 29 as illustrated in FIG. 5. The legs 29 are rigidly affixed to the interior corner surfaces of the plate 46 where it joins with the upturned side edges or flanges 48 as by welding 50. As illustrated in FIG. 5, the upper edges of the side edges 48 provide a guide for the conductive cable 45. Also, the top edges of the flanges or side edges 48 are inclined as at 52 to more effectively guide the cable 45 during longitudinal movement of the tool 20 in relation to the cable 45. The plate 46 also includes a vertically extending and longitudinally extending blade 54 having an upwardly inclined and bevelled sharpened inner edge 56 projecting above the plate 46. The plate 46 is provided with a notch or slot 58 in the outer end edge thereof and the blade includes a bottom plate 60 engaged with the bottom surface of the plate 46 and being rigidly affixed thereto as by welding or the like or by a detachable connnection to enable the blade to be assembled and replaced if necessary. The bevelled inclined sharp edge 56 of the blade may be sharpened by using any suitable sharpening implements such as a file, stone or the like in order to maintain the blade 54 sharp for effectively slitting insulation 62 forming part of the cable 45 which, as illustrated, is a multiple wire cable with the slit in the insulation material 62 being designated by the numeral 64 thus enabling the individual insulated conductors 66 to be easily exposed and the desired length of insulating material 62 severed from the remainder of the cable 45.

FIG. 1 illustrates the manner of use of the device in which the tool 20 is placed generally along the inner surface of the palm 68 of the hand 70 of the user with the thumb 72 generally paralleling and overlying the upper component 22 with the tip of the thumb generally coinciding with the end of the plate 26 which overlies the blade 54. The lower component 24 is gripped by the fingers 74 as illustrated with the forefinger being positioned in engagement with the under surface of the plate 46 adjacent the outer end thereof so that manual pressure exerted inwardly by the thumb and fingers with the cable 45 positioned therebetween will cause the sharpened edge 56 of the blade 54 to penetrate the insulation material 62 and as the wire stripper 20 is moved longitudinally with respect to the cable 45 and inward pressure is continued to be exerted thereon, the insulation 62 will be provided with a slit 64 thereby facilitating removal of the insulation 62. This structure enables an electrician or other person using the device to effectively and efficiently remove insulation material from electrical conductive cables or wires with it being pointed out that the insulation on a single wire can be stripped just as readily as insulation on a multiple wire cable.

Referring now specifically to FIGS. 7–11 of the drawings, the wire stripper illustrated therein is designated by reference numeral 80 and includes an upper component 82 and a lower component 84 hingedly interconnected by a hinge structure 86. Also, in this embodiment of the invention, an intermediate component 88 is provided which is in the form of a depth control arrangement.

The upper component 82 is in the form of an elongated, flat, rigid rectangular plate 90 and the lower component 84 is also in the form of an elongated, flat, rigid rectangular plate 92. The intermediate component 88 is also in the form of an elongated, flat, rigid rectangular plate 94 with the relative length of the plates 90, 92 and 94 being best illustrated in FIG. 8. The hinge connection 86 is a Z-shaped yoke including an upper leg 96 received in a transverse sleeve 98 mounted fixedly at the center of the upper surface of the plate 90 as by welding 100 with the leg 96 being retained in place by a washer 102 and an enlarged or peaned terminal end 104 thus pivotally connecting the leg member 96 to the plate 90 for pivotal movement of the plate 90 about the axis of the leg member 96. An upper bight portion 106 extends perpendicularly downwardly from the leg member 96 and extends transversely of the side edges of the plate 90 and the intermediate plate 94 as illustrated in FIGS. 7 and 8. The lower end of the upper bight portion 106 is provided with an inwardly extending leg 108 parallel to the leg 96 and which extends under and is rigidly secured to the undersurface of the intermediate plate 94 by welding 110 as illustrated in FIG. 8. The end of the leg 108 remote from the upper bight portion 106 includes a short lower bight portion 112 which extends transversely of the edge of the lower plate 92 remote from the upper bight portion 106 with the lower bight portion 11 terminating in a leg 114 that is parallel to the legs 96 and 108 and which extends under the lower plate 92 and is received in a sleeve 116 attached to the undersurface of the central portion of the lower plate 92 by welding 118. The leg 114 is retained in the sleeve 116 by a washer 120 and an enlarged or peaned end 122 as illustrated in FIG. 7. Thus, the plates 90, 94 and 92 are capable of pivotal movement with the plate 90 pivoting about an axis of the upper leg 96, the plate 94 being rigid with respect to the hinge structure but capable of rocking movement about the hinge axis of leg 96 with the plate 92 being pivotal about the hinge axis of the leg 114 for movement relative to the plate 94 and plate 90. The spatial relation between the plates 90 and 94 is maintained by the upper bight member 106 for laterally receiving an electrical cable or insulated wire 124 therebetween.

The lower plate 92 is provided with a blade 126 mounted on the end thereof with the blade including a bevelled and upwardly inclined sharpened edge 128 with the blade 126 being the same as the blade 54 in FIGS. 1-6 and mounted on the plate 92 in the same manner as the blade in FIGS. 1-6 is mounted. The portion of the plate 94 which overlies and is aligned with the blade 126 is provided with a slot or notch 130 therein which receives the blade therethrough with the thickness of the plate 94 being such that the upper tip end of the blade 126 can extend above the plate 94 for engagement with and slitting of the cable or wire 124 as illustrated in FIG. 8. The pivotal movement of the slotted end 130 of the plate 94 toward the blade end of the plate 92 is limited by an adjustment screw 132 which is screw threaded through the bottom plate 92 and engages the undersurface of the plate 94 with the screw 132 including a kerf 134 or other means to enable the screw to be rotatably adjusted to adjust the point of contact with the undersurface of the plate 94. The screw 132 is located in spaced relation to the hinge axis between the plates 92 and 94 and between the hinge axis and the blade 126 thereby controlling the degree of penetration of the sharpened edge of the blade 128 upwardly beyond the upper surface of the plate 94 thereby controlling penetration into the electrical wire or cable 124. A U-shaped spring 136 is interposed between the plates 92 and 94 on the side of the hinge connection opposite the screw 132 and blade 126 to bias the plates 92 and 94 about the hinge axis to retain the undersurface of the blade 94 against the tip of the screw.

The end of the plate 90 aligned with the blade 126 is provided with a U-shaped wire rod guide 138 welded to the plate 90 at 140 and including depending legs 142 which extend beyond the undersurface of the plate 90 to form a guide for retaining the electrical cable or wire 124 in registry with the blade 126 as illustrated in FIG. 9.

FIG. 11 illustrates an attachment 144 for the legs 142 of the guide in the form of a plate having sockets 146 receiving the legs 144 and a downwardly opening, semicircular notch 148 which is in alignment with the blade 126. The adapter 144 may be constructed of metal, or plastic and is frictionally held on the legs 142 to enable interchange and selective use. The ends of the plates 94 and 92 opposite from the blade 126 include L-shaped adapters 150 secured thereto by rivets or screws 152 with the facing edges including a plurality of semi-circular notches 154 to receive different gauge wires with the edge of the notches 154 being sharpened to form a peripheral cut in insulation material on conductive wires. This embodiment is used in substantially the same manner as that illustrated in FIGS. 1-6 and includes additional features as described.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. A wire stripper comprising a pair of elongated members oriented in overlying relation, means connecting said members and spacing them apart and enabling said members to rock about a transverse pivot axis to enable the ends of the elongated members to move toward and away from each other about the transverse axis, a blade mounted longitudinally on one end of one of said members with the blade projecting toward the other of said members and including a sharpened edge for forming a slit in insulation material on an insulated wire when the wire is positioned between said members and the end of the member having the blade thereon is biased toward the adjacent end of the other member and the insulated wire moved longitudinally, and means on the end of one of said members adjacent the blade forming a guide for movement of the insulated wire while in engagement with the blade, said member having the blade thereon being a generally U-shaped wire member having a transverse plate rigidly secured to the free ends of the wire member, said plate having said blade having said blade mounted thereon with the sharpened edge of the blade being inclined and facing toward the opposite end of said wire member, said wire member including a pair of generally parallel legs with each leg having a loop therein to receive the means connecting said elongated members.

2. The structure as defined in claim 1 wherein said means guiding the insulated wire includes upturned side flanges on the plate extending generally parallel to the blade and beyond the legs of the elongated U-shaped member to receive and guide the insulated wire.

3. The structure as defined in claim 2 wherein the other elongated member is in the form of an elongated rectangular plate, said means connecting said members including a substantially U-shaped yoke having one leg thereof received in the loops for pivotal movement in relation thereto and the other leg being rigidly affixed to the central portion of the elongated plate and a bight portion extending between said elongated members to space the elongated members apart for rocking movement about an axis defined by the loops on the legs of the wire member to enable an insulated wire to be positioned between the elongated members when they are generally parallel and spaced apart with the elongated members being received in the palm of a hand of a user and force directed against the external surfaces of the plate having the blade mounted thereon and the end of the elongated plate in registry therewith for forcing an insulated wire therebetween into engagement with the blade for forming a slit in the insulation on the wire when the insulated wire is moved longitudinally while pressure is applied by the opposed thumb and forefinger on the elongated members.

4. A wire stripper comprising a pair of elongated members oriented in overlying relation, means connecting said members and spacing them apart and enabling said members to rock about a transverse pivot axis to enable the ends of the elongated members to move toward and away from each other about the transverse axis, a blade mounted longitudinally on one end of one of said members with the blade projecting toward the other of said members and including a sharpened edge for forming a slit in insulation material on an insulated wire when the wire is positioned between said members and the end of the member having the blade thereon is biased toward the adjacent end of the other member and the insulated wire moved longitudinally, and means on the end of one of said members adjacent the blade forming a guide for movement of the insulated wire while in engagement with the blade, each of said elongated members being in the form of an elongated rectangular plate, said guide means including a U-shaped guide member mounted on the end of one of said plates and projecting toward the other of said plates, said blade being mounted centrally of the U-shaped guide member, said means connecting said members including a rigid yoke having one leg hingedly attached transversely of one of said plates and the other leg hingedly attached transversely of the other of said plates to space the plates apart and enable rocking movement of the plates in relation to each other for positioning an insulated wire longitudinally therebetween by lateral insertion of the insulated wire to enable pressure to be applied to the outer surfaces of the plates to cause the blade to penetrate the insulation on the insulated wire and form a slit therein when the wire is moved longitudinally.

5. The structure as defined in claim 4 together with an intermediate plate overlying the plate having the blade thereon and being rigidly mounted from the yoke, said intermediate plate having a slot therein receiving the blade and limit means between the plate having the blade thereon and the intermediate plate to limit the pivotal movement of the intermediate plate toward the plate having the blade thereon to limit the projection of the blade through the slot in the intermediate plate thereby controlling the depth of penetration of the blade into an insulated wire.

6. The structure as defined in claim 6 together with spring means biasing the intermediate plate and the plate with the blade thereon in a direction to extend the blade through the slot in the intermediate plate.

7. The structure as defined in claim 6 wherein said U-shaped guide member includes an attachment in the form of a transverse member having a notch therein facing the blade and conforming generally with the exterior surface of an insulated wire for accurately guiding the wire in relation to the blade.

8. The structure as defined in claim 6 wherein the ends of the plate having the blade thereon and the intermediate plate opposite from the end of the plates having the blade and slot therein being provided with attachment members having facing edges provided with notches receiving different gauge insulated wires for peripherally cutting insulation on the wires.

9. A device for removing covering material from an elongated covered member by forming a slit in said material, said device comprising a pair of elongated opposed members disposed in spaced, aligned, superimposed, opposed relation, means hingedly connecting intermediate portions of said spaced elongated opposed members, said means hingedly connecting said members extending between said opposed members at only one side edge portion thereof thereby enabling the members to receive the covered elongated member therebetween when said members are generally parallel by laterally inserting the covered member from the side edge portion of the opposed members opposite from the means hingedly connecting said opposed members with the end portions of said members being pivotal toward and away from each other, said opposed members being dimensioned for grasping in the palm of a hand of a user with the thumb and forefinger engaging outer surfaces of aligned end portions of said opposed members for applying inward force thereon, and a blade mounted longitudinally on the end portion of one of said opposed members and extending toward an aligned end portion of the other opposed member to penetrate the covering material and form a slit therein when the elongated covered member is moved longitudinally in relation to said opposed members and blade.

10. The device as defined in claim 9 wherein said means hingedly connecting said opposed members includes a hinge member having a pair of spaced parallel legs connected to said opposed members and a bight portion perpendicular to the legs and positioned at only one side edge portion of each of said opposed members thereby leaving the space between the other side edge portions of the opposed members free of obstructions to facilitate lateral insertion of the covered member into the space between the opposed members, at least one of said legs being pivotally connected to one of said opposed members.

* * * * *